United States Patent
Epstein et al.

(10) Patent No.: US 9,460,716 B1
(45) Date of Patent: Oct. 4, 2016

(54) USING SOCIAL NETWORKS TO IMPROVE ACOUSTIC MODELS

(71) Applicant: Google Inc., Mountain View, CA (US)

(72) Inventors: Mark Edward Epstein, Mountain View, CA (US); Martin Jansche, Mountain View, CA (US)

(73) Assignee: Google Inc., Mountain View, CA (US)

( * ) Notice: Subject to any disclaimer, the term of this patent is extended or adjusted under 35 U.S.C. 154(b) by 253 days.

(21) Appl. No.: 13/937,408

(22) Filed: Jul. 9, 2013

Related U.S. Application Data

(60) Provisional application No. 61/699,337, filed on Sep. 11, 2012.

(51) Int. Cl.
*G10L 15/22* (2006.01)
*G10L 15/07* (2013.01)
*G10L 15/065* (2013.01)

(52) U.S. Cl.
CPC ............. *G10L 15/22* (2013.01); *G10L 15/065* (2013.01); *G10L 15/07* (2013.01)

(58) Field of Classification Search
CPC ... G10L 15/063; G10L 15/07; G10L 15/065; G10L 15/144
See application file for complete search history.

(56) References Cited

U.S. PATENT DOCUMENTS

| | | | |
|---|---|---|---|
| 6,363,348 B1 * | 3/2002 | Besling et al. | 704/270.1 |
| 6,366,882 B1 * | 4/2002 | Bijl et al. | 704/235 |
| 6,442,519 B1 * | 8/2002 | Kanevsky et al. | 704/243 |
| 6,766,295 B1 * | 7/2004 | Murveit et al. | 704/243 |
| 2003/0036903 A1 * | 2/2003 | Konopka et al. | 704/249 |
| 2003/0144841 A1 * | 7/2003 | Shao | 704/251 |
| 2004/0243412 A1 * | 12/2004 | Gupta et al. | 704/254 |
| 2007/0124134 A1 * | 5/2007 | Van Kommer | 704/10 |
| 2008/0082332 A1 * | 4/2008 | Mallett et al. | 704/250 |
| 2008/0147404 A1 * | 6/2008 | Liu et al. | 704/256.2 |
| 2010/0312560 A1 * | 12/2010 | Ljolje et al. | 704/254 |
| 2011/0295590 A1 * | 12/2011 | Lloyd et al. | 704/8 |
| 2012/0323575 A1 * | 12/2012 | Gibbon et al. | 704/246 |

* cited by examiner

*Primary Examiner* — Samuel G Neway
(74) *Attorney, Agent, or Firm* — Fish & Richardson P.C.

(57) ABSTRACT

Methods, systems, and apparatus, including computer programs encoded on computer storage media, for acoustic model generation. One of the methods includes identifying one or more demographic characteristics for a user of a social networking site. The method includes receiving speech data from the user, the speech data associated with a user device. The method includes storing the speech data associated with demographic characteristics of the user and the user device.

17 Claims, 5 Drawing Sheets

USING SOCIAL NETWORKS TO IMPROVE ACOUSTIC MODELS

CROSS-REFERENCE TO RELATED APPLICATIONS

This application claims priority to U.S. Provisional Application Ser. No. 61/699,337, filed on Sep. 11, 2012, entitled "USING SOCIAL NETWORKS TO IMPROVE ACOUSTIC MODELS," the entire contents of which are hereby incorporated by reference.

TECHNICAL FIELD

This specification relates to speech recognition.

BACKGROUND

Speech recognition refers to the process of converting spoken words to text. Speech recognition systems translate verbal utterances into a series of computer readable sounds which are compared to known words. For example, a microphone may accept an analog signal which is converted into a digital form that is divided into smaller segments. The digital segments can be compared to the smallest elements of a spoken language. From this comparison, the speech recognition system can identify words by analyzing the sequence of the identified sounds to determine, for example, corresponding textual information.

SUMMARY

In general, one innovative aspect of the subject matter described in this specification can be embodied in methods that include the actions of identifying one or more demographic characteristics for a user. The methods include the actions of receiving speech data from the user of a social networking site, the speech data associated with a user device. The methods also include the actions of storing the speech data associated with demographic characteristics of the user and the user device.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Identifying the one or more demographic characteristics may include identifying a demographic characteristic of a second user, the second user related to the user on a social networking site. The methods may include identifying at least one target demographic characteristic. The methods may include obtaining speech data associated with the at least one target demographic characteristic, the speech data received from a plurality of users. The methods may include generating an acoustic model using the speech data. The methods may include associating the acoustic model with at least one the target demographic characteristic. The methods may include generating acoustic models for a plurality of demographic characteristics. The at least one target demographic characteristic may include at least one of the group consisting of age, gender, and regional accent. Identifying one or more demographic characteristics of the user may include determining a demographic characteristic based on a topic of discussion. Identifying one or more demographic characteristics of the user may include determining a demographic characteristic based on user profile information. Obtaining speech data associated with the at least one target demographic characteristic may selecting users based on a clustering model. Selecting users based on the clustering model may include determining a probability that a user is a member of the cluster.

Particular embodiments of the subject matter described in this specification can be implemented so as to realize one or more of the following advantages. Acoustic models can be customized for a greater number of user categories. Relationships and other types of information represented in a social graph can be leveraged to improve acoustic models.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A speech recognition system typically uses an acoustic model and a language model to recognize speech. In general, an acoustic model includes digital representations of individual sounds that are combinable to produce a vast collection of words, phrases, etc. A language model assigns a probability that a sequence of words occur together in a particular sentence or phrase.

In general, building an acoustic model includes processing how individuals pronounce different sounds. Pronunciation can differ between different individuals based on a wide variety of different criteria including age, gender, social economic class, and region. For example, a mid-westerner may pronounce "especially" as "ex-specially" or "across" as "acrost." Building an acoustic model requires both the sounds of one or more individual speaking words and an identification of the words spoken.

Figure 1:
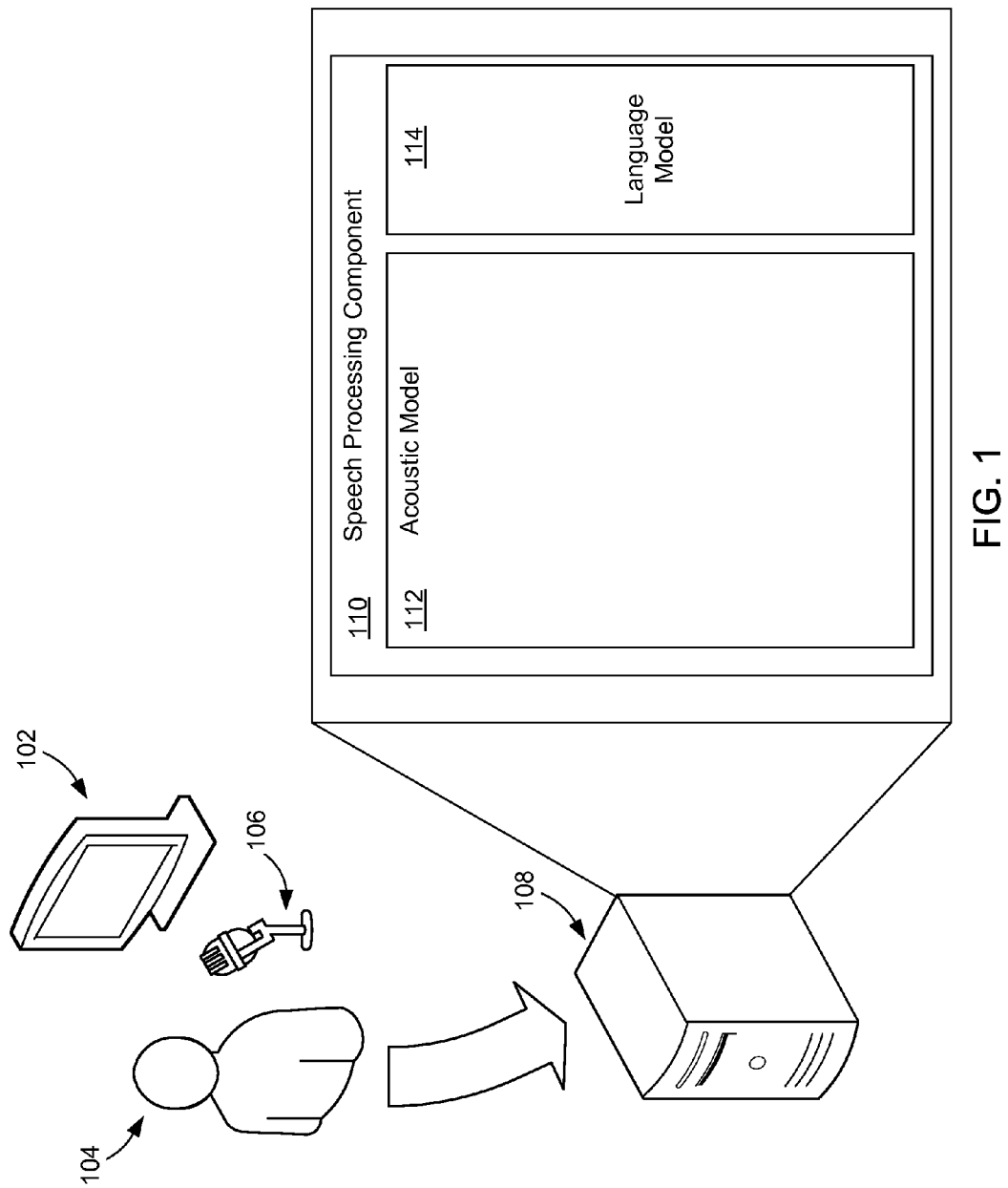
FIG. 1 illustrates an example system for recognizing speech.

FIG. 1 illustrates an example system for speech recognition. In this particular arrangement, a user 104 speaks into a microphone 106 of a computer system 102. The computer system 102 may be a standalone computer connected to a network or any computational device connected to a microphone, for example, a personal computer, a tablet computer, a smart phone, etc.

The user's speech is sent to a computer system 108 over one or more networks (not shown), for example, the Internet.

The computer system includes a speech processing component 110 that includes an acoustic model 112 and a language model 114.

The acoustic model 112 maps the sounds collected from the user 104 into component parts, called phones, that represent the basic elements of speech. For example, the English language can be spoken using approximately 40-60 phones. The acoustic model 112 accepts sounds and maps them to corresponding phones. In some systems, phones are combined with neighboring phones to create combinations of phones referred to as tri-phones. The tri-phones model phonemes in the context in which they appear. For example, the "t" in "Tim" is pronounced differently than the "t" in "butter". From the phones or tri-phones, the acoustic model 112 can identify one or more words that the user 104 may have spoken. However, conventional acoustic models have limited effectiveness because different individuals pronounce words and sounds slightly differently. For example, a middle aged man from New York sounds substantially different than a young girl from Oklahoma. The quality of the output of an acoustic model can be improved by selecting an acoustic model built from samples of speech from users with similar characteristics (e.g., demographic characteristics). In general, factors that affect the performance of an acoustic model include demographic information for example age and gender; regional accent information for example a southern accent or a Boston accent (pronouncing idea as "idear"; dialects (for example, Southern, New Orleans) ("y'all"); and the device being used (for example, smart phone, headset, remote microphone, etc.).

Even when using an appropriate acoustic model, the basic elements of speech can be identical or very similar. For example, an acoustic model alone cannot distinguish homonyms such as red and read. Similarly, words such as "Boston" and "Austin" sound very similar. A language model 114 is used to determine the most likely words or phrases being spoken. The language model 114 contains a statistical representation of how often words co-occur. Words are said to co-occur if they are used in a phrase, sentence, etc. without any intervening words. For example, in the phrase "the quick brown fox jumped over the lazy dog" co-occurrences of two words include "the quick", "quick brown", "brown fox", "fox jumped", "jumped over", "over the", "the lazy", and "lazy dog". Co-occurrences of three words include "The quick brown", "quick brown fox", "brown fox jumped", "fox jumped over", "jumped over the", "over the lazy", "the lazy dog." The language model is used to check the output of the acoustic model or to select the most likely phrase from a group of possible phrases.

Developing acoustic models often requires a relatively large set of data. The data includes samples of people speaking known words. The speech is broken into phones based on the phones known to make up the word. Different individuals pronounce words differently. For example, an individual from Boston may pronounce "idea" like "idear." The more similar the speech of the individual to the samples used to create the acoustic model the better the acoustic model performs for that individual. Factors that may affect the performance of an acoustic model include the similarity between the characteristics of the individuals using the acoustic model and the ages of the individuals who provided samples which were used to create the acoustic model. These characteristics can include, for example, age, gender, and geographic location.

One source of data to build an acoustic model is from voice recognition interactions of a user with, such as the user 104, with an electronic device, such as the computer 102.

The user interacts with the electronic advice using voice recognition. The resulting text is either accepted or corrected. If it's accepted the system determines that the voice was correctly interpreted, if the text is correct, the system determines the corrected text is what the user was saying. In this manner, a voice sample and the accompanying text can be identified. However, the voice samples from a single user may not be sufficient to create a robust acoustic model. Instead, the system can combine the voice sample with the voice samples of other users who have similar characteristics to the user.

The system may identify some characteristics of the user based on information provided by the user. For example, the user may reveal their birthplace, where and when they went to school, their birthdate, their gender, etc. . . . . Even when the user does not provide specific information about them, the system can derive some of this information using social relationships.

The system may identify the relationships between the users based on input provided by the user 104 and the other users. For example, the user 104 may identify his or her spouse and the user may have a group of friends labeled "college buddies" or "co-workers." In some implementations, the speech processing component 110 can derive relationships based on user provided information (e.g., a user profile). For example, if two users work for the same employer and are members of each other's social graph, the system may determine and identify them as colleagues. If most of a user's friends are self-identified as "female" then the system may determine that the user is also "female." If a user identifies another user as a "class mate" then the system may assume they are the same age.

Figure 2:
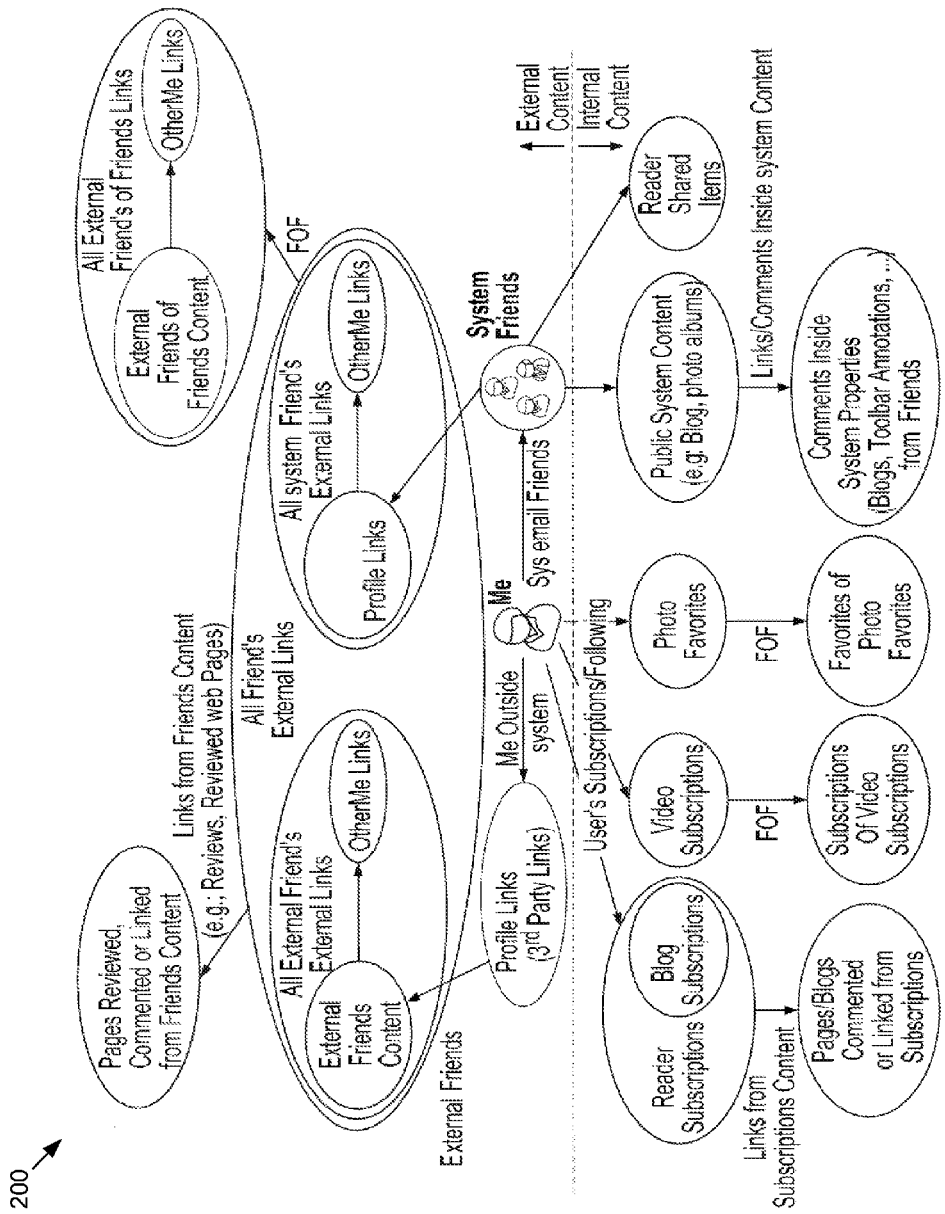
FIG. 2 is a diagram of example sources of social graph information.

FIG. 2 is a diagram 200 of example sources of social graph information. The user's social graph is a collection of connections (e.g., users, resources) identified as having a relationship to the user within a specified degree of separation. The user's social graph can include people and particular content at different degrees of separation. For example, the social graph of a user can include friends, friends of friends (e.g., as defined by a user, social graphing site, or other metric), the user's social circle, people followed by the user (e.g., subscribed blogs, feeds, or web sites), co-workers, and other specifically identified content of interest to the user (e.g., particular web sites).

Diagram 200 shows a user and the different connections possible to extend a user's social graph to people and content both within a system and across one or more external networks and shown at different degrees of separation. For example, a user can have a profile or contacts list that includes a set of identified friends, a set of links to external resources (e.g., web pages), and subscriptions to content of the system (e.g., a system that provides various content and applications including e-mail, chat, video, photo albums, feeds, or blogs). Each of these groups can be connected to other users or resources at another degree of separation from the user. For example, the friends of the user each have their own profile that includes links to resources as well as friends of the respective friends. The connections to a user within a specified number of degrees of separation can be considered the social graph of the user. In some implementations, the number of degrees of separation used in determining the user's social graph is user set. Alternatively, a default number of degrees of separation is used. Moreover, a dynamic number of degrees of separation can be used that is based on, for example, the type of connection.

In some implementations, the membership and degree of separation in the social graph is based on other factors, including a frequency of interaction. For example, a frequency of interaction by the user (e.g., how often the user visits a particular social graphing site) or type of interaction (e.g., endorsing or selecting items associated with friends). As interaction changes, the relationship of a particular contact in the social graph can also dynamically change. Thus, the social graph can be dynamic rather than static.

In some alternative implementations, social signals can be layered over the social graph (e.g., using weighted edges or other weights between connections in the social graph). These signals, for example, frequency of interaction or type of interaction between the user and a particular connection, can then be used to weight particular connections in the social graph or social graphs without modifying the actual social graph connections. These weights can change as the interaction with the user changes.

Figure 3:
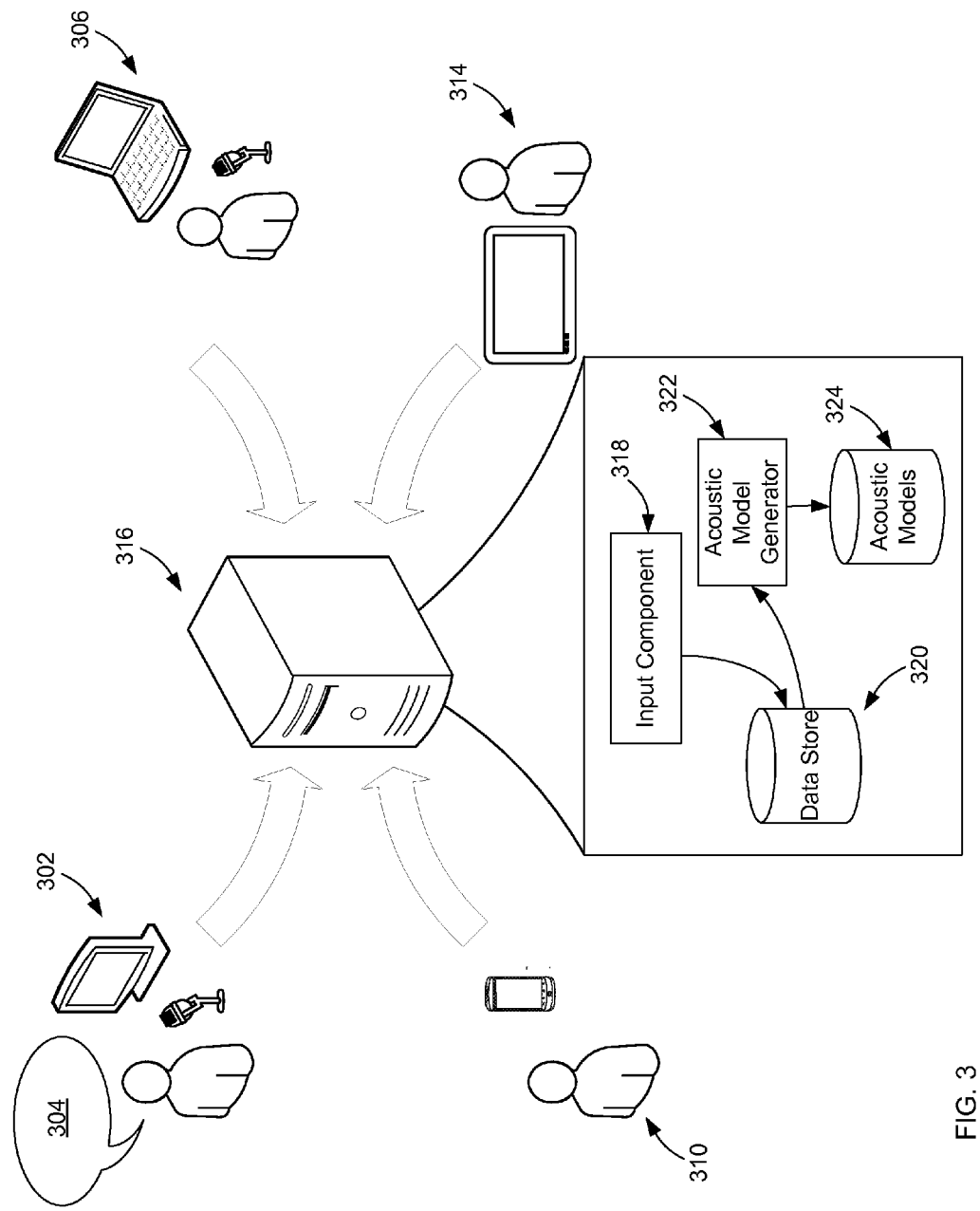
FIG. 3 illustrates an example of generating acoustic models from interactions on a social networking site.

FIG. 3 illustrates an example of generating acoustic models from interactions on a social networking site. Users 304, 308, 312, 314 interact with a social networking site hosted on a server 316. An input component 318 can process input from each user, for example, the user 302. In some scenarios, the input may be in the form of vocal utterances (represented by a discussion bubble 304) provided over a microphone associated with an electronic device. For example, the users may be using speech recognition associated with the device or the social networking site. Users can communicate with the server 316 using a variety of computing devices including, for example, desktop computers, notebook computers, smart phones, and tablet devices.

To improve the quality of the acoustic model that interprets the vocal utterances, the input component 318 can store sound data including the provided audio and a text version in a data store 320. In some implementations, the data is stored in the data store 320 with an indicator identifying the kind of device and characteristics of the user who supplied the vocal utterances. In some implementations, the sound data can be stored with demographic categories that correspond to the user characteristics. For example, individuals may be grouped into demographic categories based on age, gender, birthplace, region of the country, etc.

An acoustic model generator 322 can generate acoustic models based on the data in the data store 320. In some implementations, the acoustic model generator 322 may generate acoustic models as the data is collected. The acoustic model generator 322 can combine data from users with user characteristics that fall into the similar demographic categories. For example, the acoustic model generator 322 may create an acoustic model for individuals who graduated college between the years 2000 and 2010, or for individuals who were born in the Midwest, or for doctors. The acoustic model generator 322 may create an acoustic models based on a combination of demographic categories, for example, doctors from the Midwest who graduated from medical school between the years 1990 and 2010.

In some implementations, the acoustic model generator 322 identifies key pieces of information from the users' profiles in order to cluster the user with other users. For example, the acoustic model generator 322 may note that the users 302, 306, 310, 314 have a relationship on a social graph (e.g. identified as "friends") and may note that all the users attended the same school during the same time period. From this information, the acoustic model generator 322 may make assumptions (e.g., from predefined rules) about the users. For example, the acoustic model generator 322 may assume that individuals graduated from college between ages 21 and 23 and therefore may determine an approximate age of the user. Other assumptions may be made, for example, if a social circle is overwhelmingly male, the acoustic model generator 322 may determine that members of the social circle who have not identified their gender are also male.

Acoustic models can be device dependent. The performance of the acoustic model can depend, at least in part, on the quality of the sound received by the microphone. Therefore, acoustic models created using sound samples from similar device may tend to perform better on those devices than acoustic models created using sound samples from different devices. The sound samples collected from the user 310 using the smart phone may not be appropriate to combine with the sound samples from the user 302 using the computer and microphone.

However, the sound samples from the user using the tablet 314 may be combined with the sound samples from the user 310 using the smart phone, provided their microphones and operating environments have similar acoustic characteristics.

Sound samples may be stored without any personally identifiable information.

Figure 4:
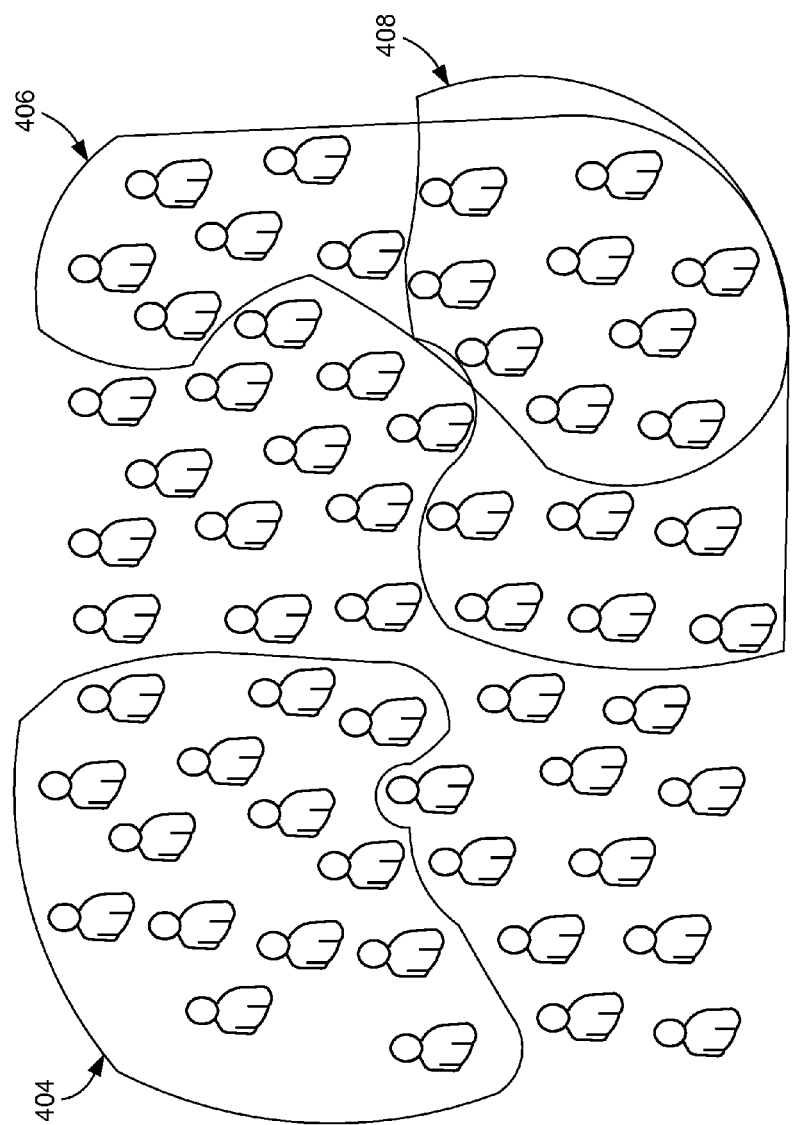
FIG. 4 graphically illustrates clustering users.

FIG. 4 graphically illustrates clustering users. Users on a social networking site frequently provide profile information which describes information about the user. This information can include gender, birthdate, birthplace, current city, education, employment, etc.

As an individual user uses a speech recognition capability on a device, for example, a computer, tablet, or smartphone, the acoustic information can be mapped to phonemes and stored in a data store. In some implementations, the data store uses the acoustic information to determine the length of a phonetic phone in a particular word, the energy with which the phonetic phone is pronounced, and the frequency with which the phonetic phone is stated.

Once sufficient data is collected, the users may be segmented based on information included in the user's profiles. For example, group 404 is a group of users in which each user's profile indicates that the user was born in the Southern United States. Group 406 is a group of user's who's user profile indicates that the users who were born in the Northern United States. Group 408 is a group of users whose user profile indicates that they currently live in the Northern United States.

Acoustic data from each group may be used to create an acoustic model specific to that demographic. Examples of user profile data that may be used to segment users and create acoustic models include gender, birth place, current residence, age, etc.

Gender divides users into male and female users. Birthplace and current residence may be determined based on state, province, or similar geopolitical entity, for example, Ohio or Ontario. Birthplace and current residence may also be determined based on a larger region, for example, Northern United States, Southern United States, or Western United States. Age may divide users into categories such as elderly, middle aged, adult, young, and child. In some implementations, acoustic models can be developed based on a combination of user profile traits. For example, the system may develop an acoustic model for adult women who were born in the Southern United States and currently live in the Western United States.

In some implementations, users can be grouped based on social graph information. For example, a user may be grouped based on their relationships in the social graph, which chat rooms they participate in, and the topics that are of interest to them, based on posts to blogs and micro-blogs. In this implementation, once an acoustic model is developed for the members of the group, the acoustic model can be used for each member of the group.

In some implementations, topics of interest can be used to infer demographic characteristics of users. For example, adults can be considered as being more likely than children to discuss politics, young adults being more likely than elderly users to discuss pop music, etc.

In some implementations, clustering algorithms can be applied based on user profile traits and relationships in a social graph as features that are used to determine the cluster. Clustering can implement a hard clustering model, where each user is associated with a single cluster. Clustering can also implement soft clustering model, where each user is associated with a probability for belonging to a particular cluster (for example, a user may have an 80% chance of being from the Northeast).

Figure 5:
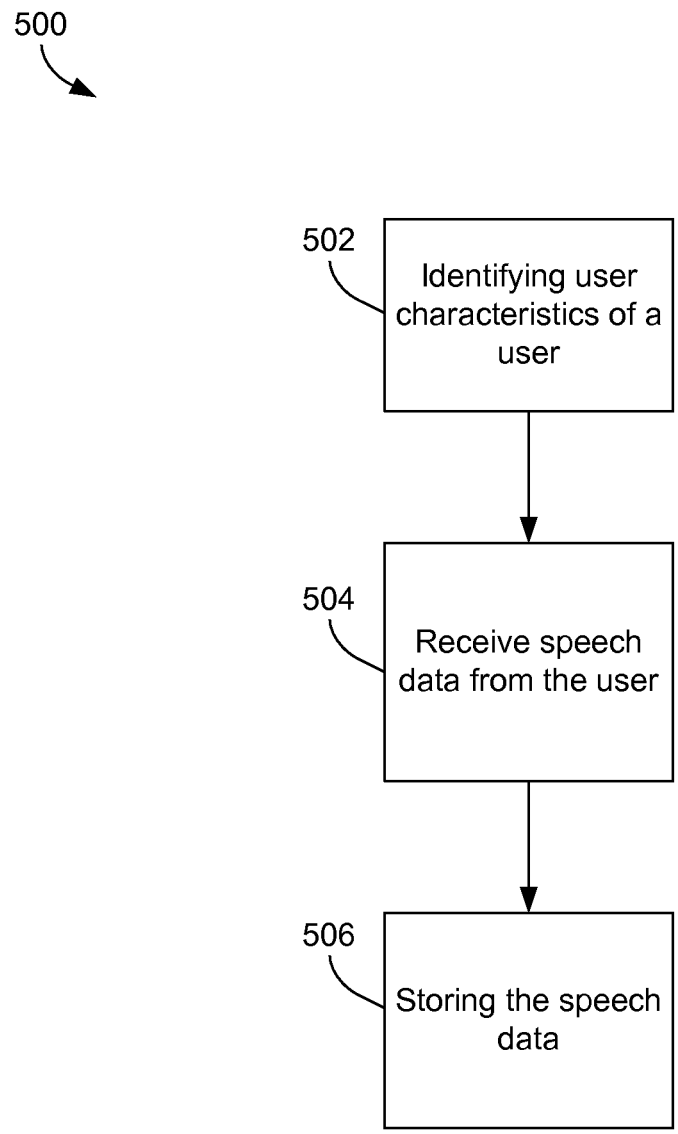
FIG. 5 is a flow chart of an example process for building acoustic models.

FIG. 5 is a flow chart of an example process for storing acoustic data. The process can be performed, for example, by the speech processing component 108 of FIG. 1. For simplicity, the process will be described in terms of a system performing the process.

User characteristics can be identified (502). A user may be associated with user characteristics, for example, age, gender, birthplace, home address, etc. The characteristics can be provided by the user in a user profile, or may be determined based on relationships between the user and other users on a social networking site.

Speech data can be received from the user (504). The speech data can be provided from a speech recognition program operating on a user device. The speech data can include both the audio of the words being spoken and a text version of the speech.

The speech data can be stored (506) and associated with the user characteristics. In some implementations, the speech data can be associated with demographic characteristics determined from the user. For example, speech data from a 34 year old man in Atlanta can be associated with demographic categories that include individuals from age 25-49 and The South-East United States.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible program carrier for execution by, or to control the operation of, data processing apparatus. Alternatively or in addition, the program instructions can be encoded on a propagated signal that is an artificially generated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to as a program, software, a software application, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    accessing audio data that encodes one or more utterances that were spoken by a user of a social network during one or more interactions between the user and the social network;
    obtaining data indicative of one or more social network connections of the user of the social network, each of the social network connections being associated with an additional user of the social network;
    identifying a demographic category that (i) characterizes at least one of the additional users associated with the one or more social network connections and (ii) is otherwise absent from a social network profile associated with the user of the social network;
    in response to identifying the demographic category that (i) characterizes the at least one of the additional users and (ii) is otherwise absent from a social network profile associated with the user of the social network, associating, in the social network profile of the user of the social network, the user of the social network with the demographic category that characterizes the at least one of the additional users and that was otherwise absent from the social network profile associated with the user of the social network;
    for each of multiple demographic categories that the social network profile indicates are associated with the user of the social network, including the demographic category that characterizes the at least one of the additional and that was otherwise absent from the social network profile associated with the user of the social network, generating an acoustic model that is specific to the demographic category, based at least on the audio data that encodes the one or more utterances that were spoken by the user of the social network during the one or more interactions between the user and the social network; and
    using one or more of the generated acoustic models in transcribing a subsequently received utterance of the user or of another user of the social network that shares a demographic category with the user of the social network.

2. The method of claim 1, comprising:
for a particular one of the demographic categories, identifying a second user of the social network that is associated with the particular one of the demographic categories; and
accessing second audio data that encodes one or more utterances that were spoken by the second user of the social network during one or more interactions between the second user and the social network,
wherein generating an acoustic model comprises generating, for the particular demographic category, an acoustic model that is specific to the particular demographic category based at least on (i) the audio data that encodes the one or more utterances that were spoken by the user of the social network during the one or more interactions between the user and the social network, and (ii) the second audio data that encodes one or more utterances that were spoken by the second user of the social network during one or more interactions between the second user and the social network.

3. The method of claim 1, wherein the demographic categories include at least one of the group consisting of age, gender, education level, birthplace, current residence, employment, and regional accent.

4. The method of claim 1, comprising:
generating an acoustic model that is specific to a combination of the multiple demographic categories that a social network profile indicates are associated with the user of the social network based on the generated acoustic models for each of the demographic categories in the combination of the multiple demographic categories.

5. The method of claim 1, comprising:
identifying a type of device through which the one or more utterances were spoken by the user of the social network during one or more interactions between the user and the social network,
wherein generating an acoustic model comprises generating an acoustic model this is specific to the type of device through which the one or more utterances were spoken.

6. The method of claim 1, comprising:
identifying the other user of the social network that shares a demographic category with the user of the social network based on a relationship on a social graph; and
creating a cluster comprising the user of the social network and the other user of the social network in response to identifying that the user of the social network and the other user of the social network share a demographic category based on their relationship on the social graph.

7. A non-transitory computer readable medium storing software comprising instructions executable by one or more computers which, upon such execution, cause the one or more computers to perform operations comprising:
accessing audio data that encodes one or more utterances that were spoken by a user of a social network during one or more interactions between the user and the social network;
obtaining data indicative of one or more social network connections of the user of the social network, each of the social network connections being associated with an additional user of the social network;
identifying a demographic category that (i) characterizes at least one of the additional users associated with the one or more social network connections and (ii) is otherwise absent from a social network profile associated with the user of the social network;
in response to identifying the demographic category that (i) characterizes the at least one of the additional users and (ii) is otherwise absent from a social network profile associated with the user of the social network, associating, in the social network profile of the user of the social network, the user of the social network with the demographic category that characterizes the at least one of the additional users and that was otherwise absent from the social network profile associated with the user of the social network;
for each of multiple demographic categories that the social network profile indicates are associated with the user of the social network, including the demographic category that characterizes the at least one of the additional users and that was otherwise absent from the social network profile associated with the user of the social network, generating an acoustic model that is specific to the demographic category, based at least on the audio data that encodes the one or more utterances that were spoken by the user of the social network during the one or more interactions between the user and the social network; and
using one or more of the generated acoustic models in transcribing a subsequently received utterance of the user or of another user of the social network that shares a demographic category with the user of the social network.

8. The computer readable medium of claim 7, comprising:
for a particular one of the demographic categories, identifying a second user of the social network that is associated with the particular one of the demographic categories; and
accessing second audio data that encodes one or more utterances that were spoken by the second user of the social network during one or more interactions between the second user and the social network,
wherein generating an acoustic model comprises generating, for the particular demographic category, an acoustic model that is specific to the particular demographic category based at least on (i) the audio data that encodes the one or more utterances that were spoken by the user of the social network during the one or more interactions between the user and the social network, and (ii) the second audio data that encodes one or more utterances that were spoken by the second user of the social network during one or more interactions between the second user and the social network.

9. The computer readable medium of claim 7, wherein the demographic categories include at least one of the group consisting of age, gender, education level, birthplace, current residence, employment, and regional accent.

10. The computer readable medium of claim 7, comprising:
generating an acoustic model that is specific to a combination of the multiple demographic categories that a social network profile indicates are associated with the user of the social network based on the generated acoustic models for each of the demographic categories in the combination of the multiple demographic categories.

11. The computer readable medium of claim 7, comprising:
identifying a type of device through which the one or more utterances were spoken by the user of the social network during one or more interactions between the user and the social network, wherein generating an acoustic model comprises generating an acoustic model this is specific to the type of device through which the one or more utterances were spoken.

12. The computer readable medium of claim 7, comprising:

identifying the other user of the social network that shares a demographic category with the user of the social network based on a relationship on a social graph; and creating a cluster comprising the user of the social network and the other user of the social network in response to identifying that the user of the social network and the other user of the social network share a demographic category based on their relationship on the social graph.

13. A system comprising:

one or more processors and one or more storage devices storing instructions that are operable, when executed by the one or more processors, to cause the one or more processors to perform operations comprising:

accessing audio data that encodes one or more utterances that were spoken by a user of a social network during one or more interactions between the user and the social network;

obtaining data indicative of one or more social network connections of the user of the social network, each of the social network connections being associated with an additional user of the social network;

identifying a demographic category that (i) characterizes at least one of the additional users associated with the one or more social network connections and (ii) is otherwise absent from a social network profile associated with the user of the social network;

in response to identifying the demographic category that (i) characterizes the at least one of the additional users and (ii) is otherwise absent from a social network profile associated with the user of the social network, associating, in the social network profile of the user of the social network, the user of the social network with the demographic category that characterizes the at least one of the additional users and that was otherwise absent from the social network profile associated with the user of the social network;

for each of multiple demographic categories that the social network profile indicates are associated with the user of the social network, including the demographic category that characterizes the at least one of the additional users and that was otherwise absent from the social network profile associated with the user of the social network, generating an acoustic model that is specific to the demographic category, based at least on the audio data that encodes the one or more utterances that were spoken by the user of the social network during the one or more interactions between the user and the social network; and using one or more of the generated acoustic models in transcribing a subsequently received utterance of the user or of another user of the social network that shares a demographic category with the user of the social network.

14. The system of claim 13, comprising:

for a particular one of the demographic categories, identifying a second user of the social network that is associated with the particular one of the demographic categories; and accessing second audio data that encodes one or more utterances that were spoken by the second user of the social network during one or more interactions between the second user and the social network, wherein generating an acoustic model comprises generating, for the particular demographic category, an acoustic model that is specific to the particular demographic category based at least on (i) the audio data that encodes the one or more utterances that were spoken by the user of the social network during the one or more interactions between the user and the social network, and (ii) the second audio data that encodes one or more utterances that were spoken by the second user of the social network during one or more interactions between the second user and the social network.

15. The system of claim 13, wherein the demographic categories include at least one of the group consisting of age, gender, education level, birthplace, current residence, employment, and regional accent.

16. The system of claim 13, comprising:

generating an acoustic model that is specific to a combination of the multiple demographic categories that a social network profile indicates are associated with the user of the social network based on the generated acoustic models for each of the demographic categories in the combination of the multiple demographic categories.

17. The system of claim 13, comprising:

identifying a type of device through which the one or more utterances were spoken by the user of the social network during one or more interactions between the user and the social network, wherein generating an acoustic model comprises generating an acoustic model this is specific to the type of device through which the one or more utterances were spoken.

* * * * *